April 13, 1937.  W. B. HARRIS  2,077,236
OIL GAS GENERATOR
Filed Aug. 31, 1934   7 Sheets-Sheet 3
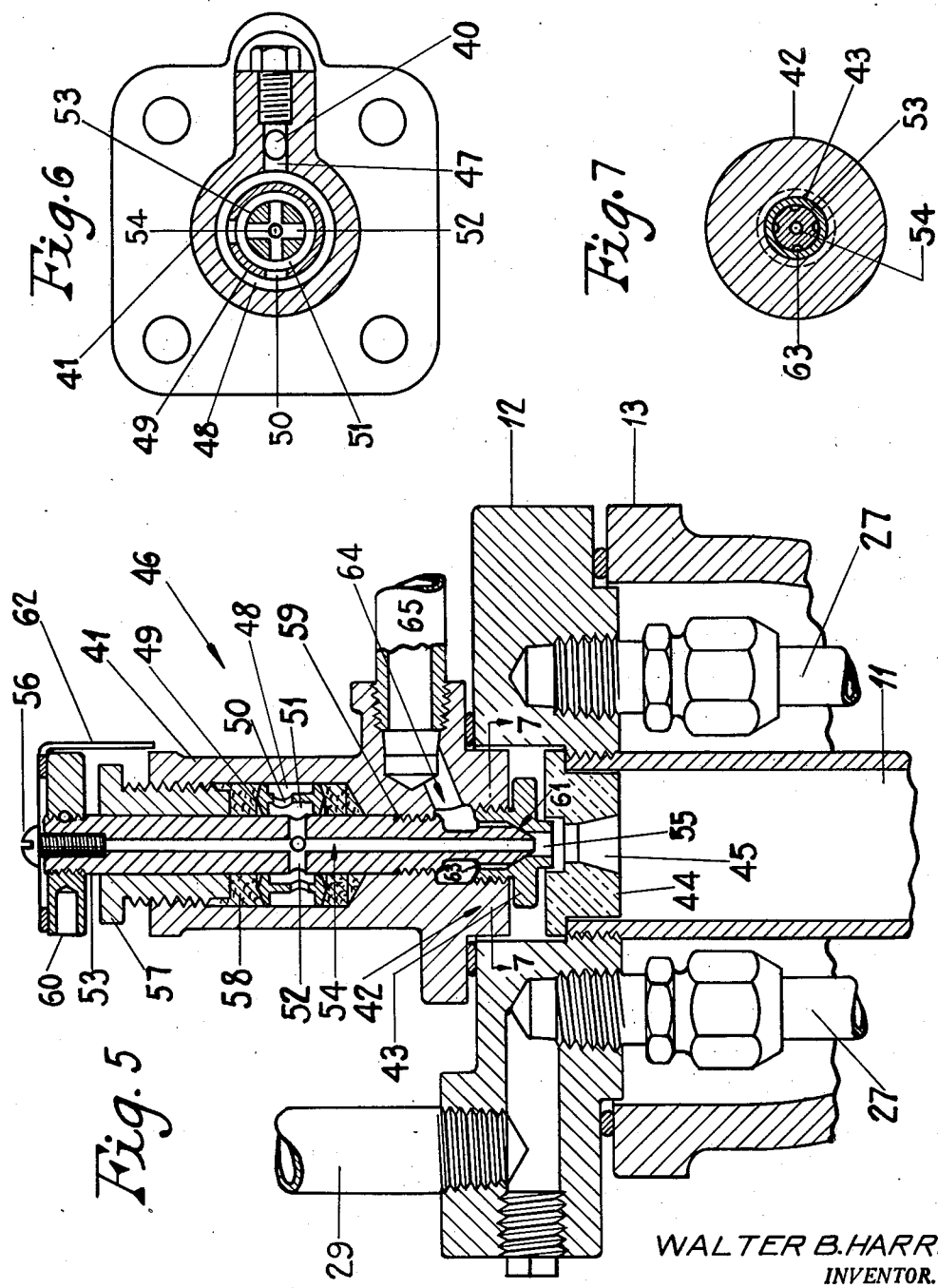
WALTER B. HARRIS
INVENTOR.
BY Joseph Blacker
ATTORNEY

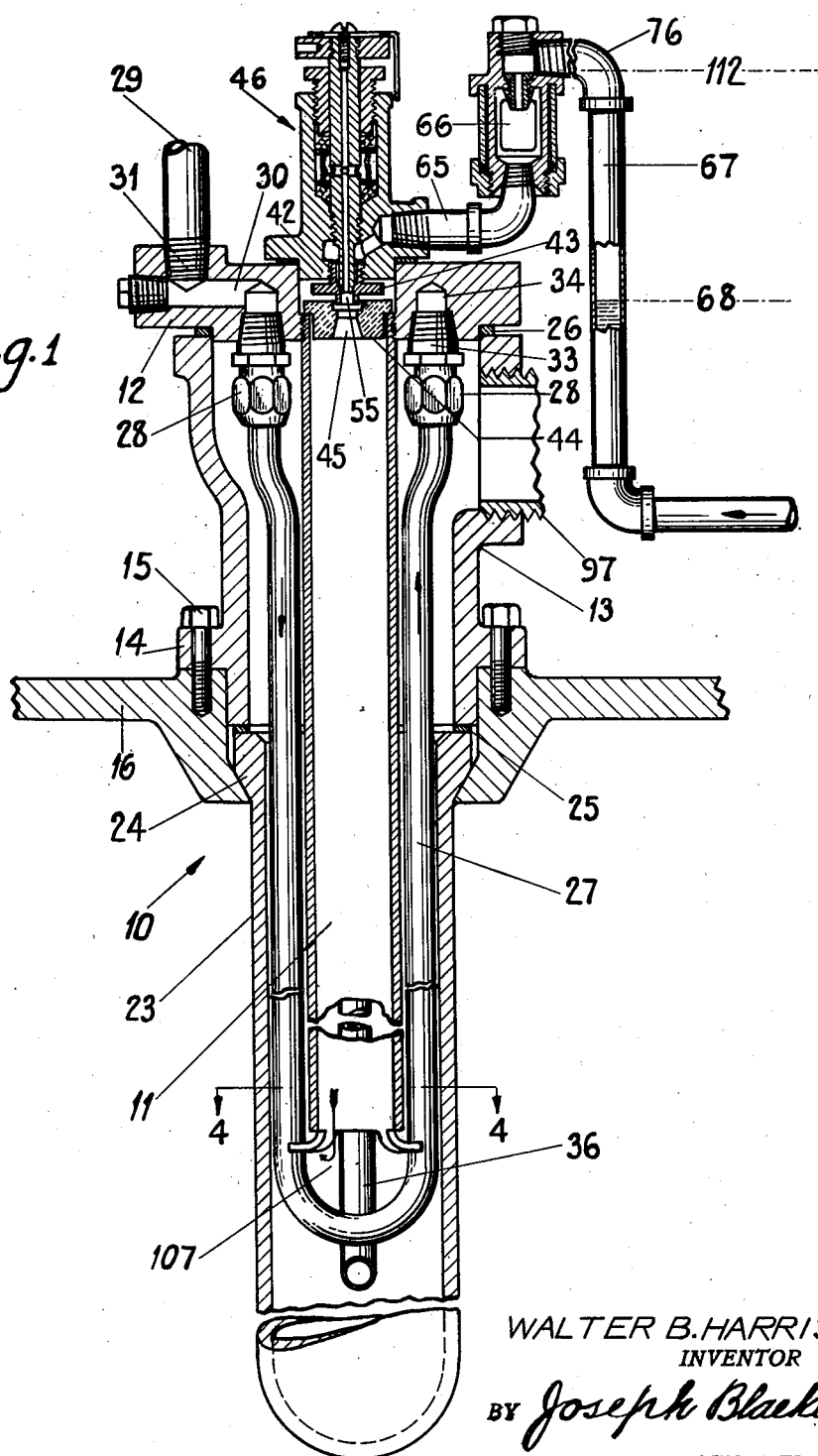

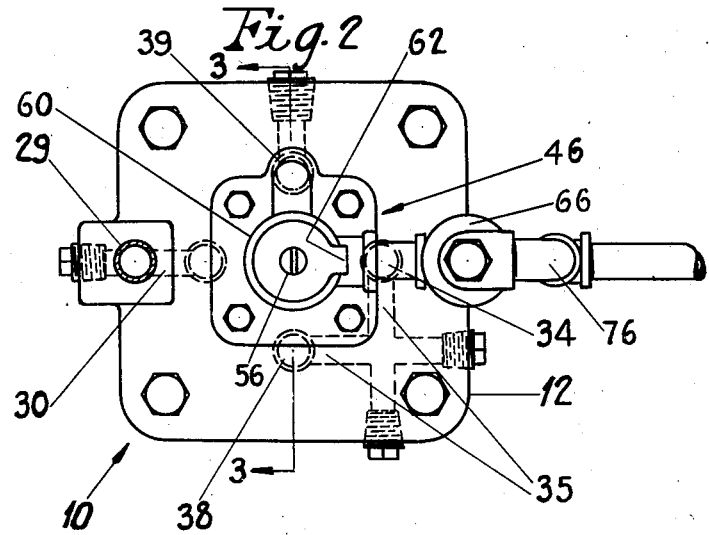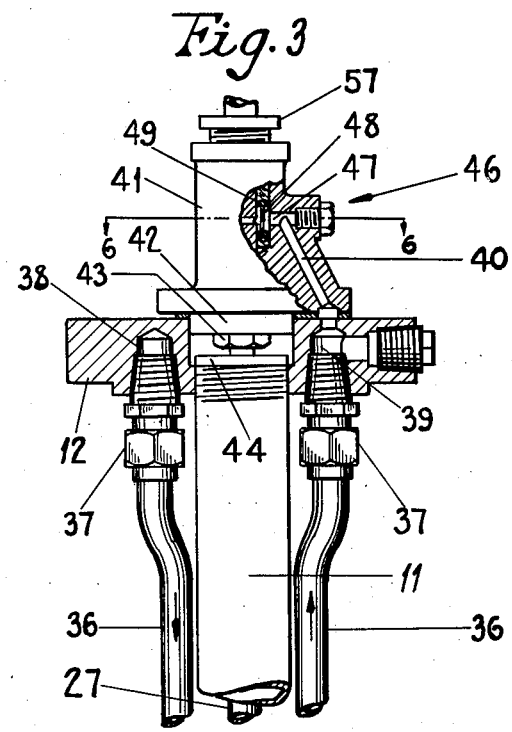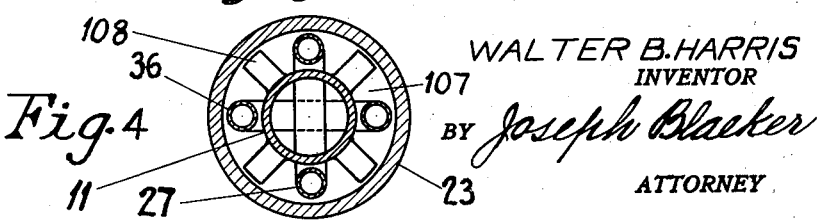

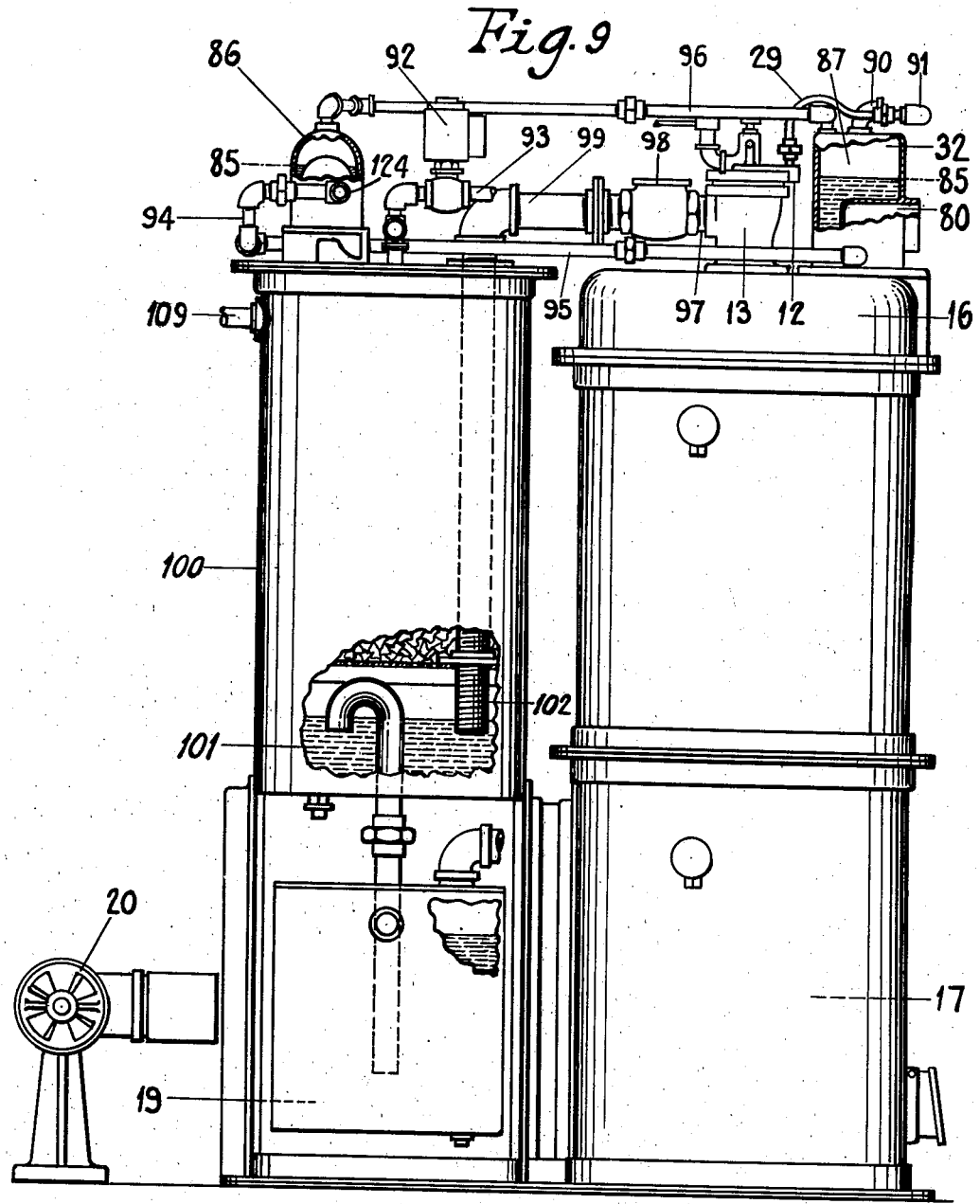

April 13, 1937. W. B. HARRIS 2,077,236
OIL GAS GENERATOR
Filed Aug. 31, 1934 7 Sheets-Sheet 6
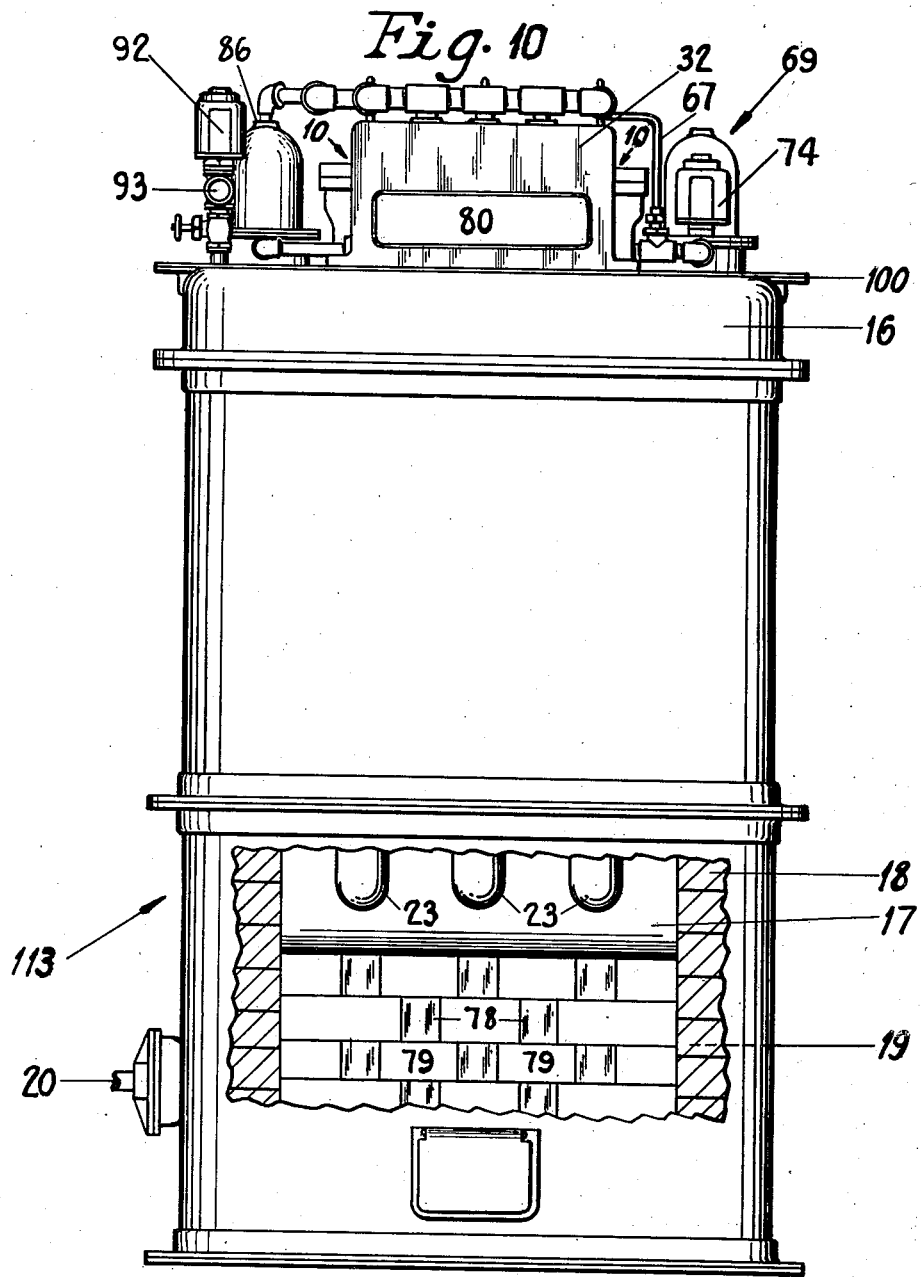
WALTER B. HARRIS
INVENTOR.
BY Joseph Blacker
ATTORNEY

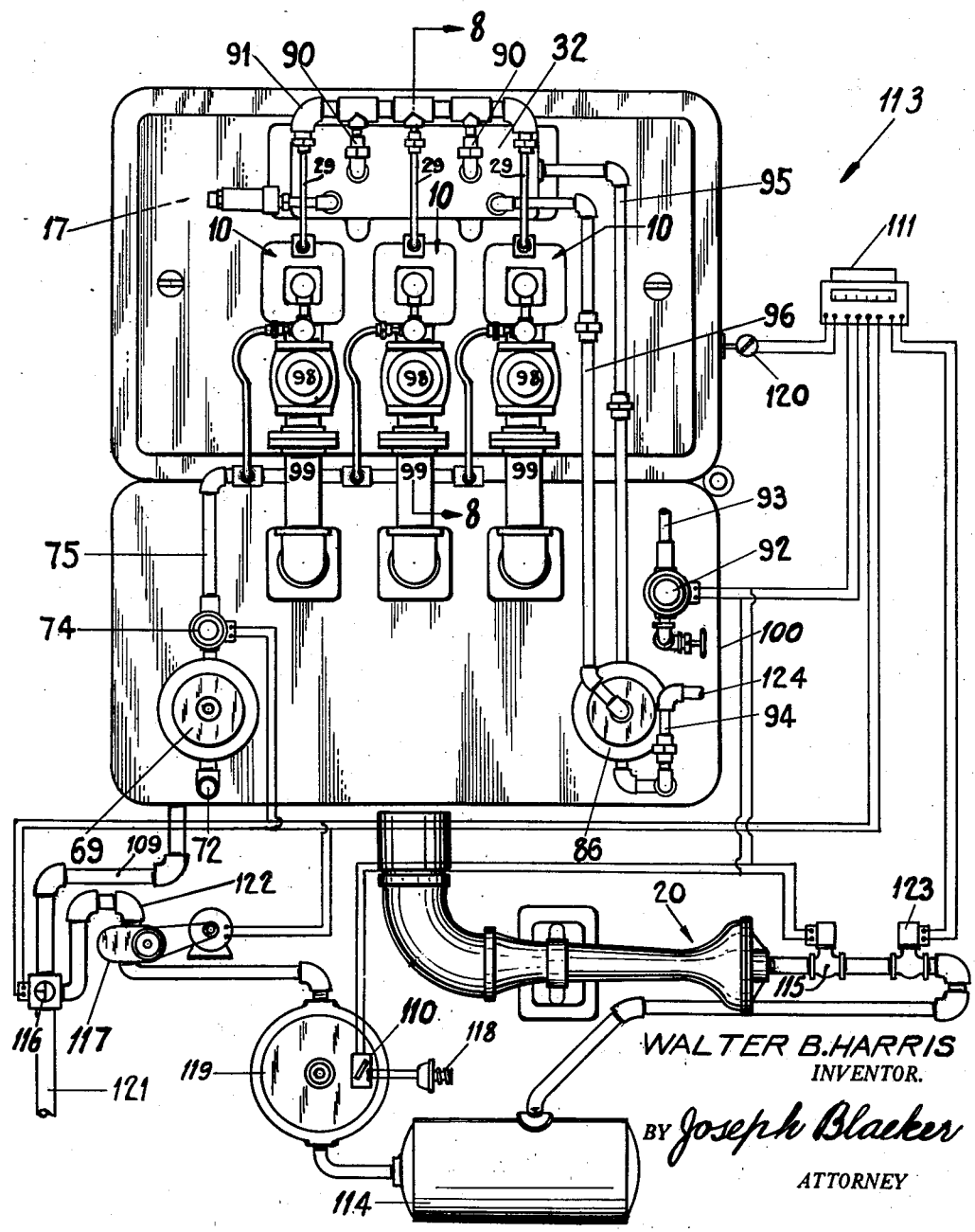

Patented Apr. 13, 1937

2,077,236

UNITED STATES PATENT OFFICE 2,077,236

OIL GAS GENERATOR

Walter B. Harris, Bayside, N. Y.

Application August 31, 1934, Serial No. 742,322

4 Claims. (Cl. 48—94)

This invention relates to an oil gas generator for generating oil gas by first raising steam to a temperature at which substantially all of it will react when brought into the presence of hydrocarbon, then bringing said steam into direct contact with hydrocarbon oil and then causing reaction under high heat influence.

This invention relates to an improvement on the oil gas generator shown and described in my prior patent application, Serial No. 715,082, filed on March 12, 1934.

In my prior oil gas generator above identified, I have disclosed a means for raising by vacuum a regulated quantity of oil from a fixed level below an injector nozzle and causing the kinetic energy of superheated steam passing through the nozzle to inject the oil into a gasifying chamber within an oil gas generator. This oil injecting means eliminated the use of pressure oil pumps having moving parts or of gravity oil feed. I have found in practice that this vacuum method of feeding the oil provides a safety feature in the operation of the gas plant in that no oil can be raised from the lower level and admitted into the gas generating chamber unless the superheated steam is present and under a predetermined pressure. I still use this method of feeding the oil into the oil gas generator herewith disclosed, but utilize the kinetic energy of steam superheated to said reaction temperature to inject the oil.

In my prior oil gas generator I have disclosed a regulated water level boiler having a steam chamber and having a superheating coil leading to the injecting means. This arrangement served to superheat the steam and to create high velocity and kinetic energy in the injecting means before contacting with the hydrocarbon oil. I have found in practice that better results are obtained by raising the superheating of the steam to a high temperature at which substantially all of it will instantly react when brought into the presence of hydrocarbon before contacting with the oil and have incorporated this feature in the oil gas generator disclosed herewith.

The herein disclosed gas making unit consists of an outer tubular casing having one end closed and having a gas outlet elbow mounted at its other end and a flow-directing plate on top of the elbow. Suspended within the casing from the flow-directing plate are U-shaped superheating tubes and a centrally mounted gas generating chamber. The said unit also comprises an injecting device in which the superheated steam functions to raise oil from a low level and feed the oil into the said gas generating chamber.

Heat from a furnace is used to produce saturated steam in a constant water level boiler having a steam chamber. From the steam chamber saturated steam under pressure passes through the U-shaped superheating tubes. The said tubes are arranged in series through interconnecting passages in the flow-directing plate. From the U-shaped tubes the superheated steam passes through the injecting device. The superheated steam and the oil are admitted into the heated gas generating chamber as a continuous fog-like mixture by means of the injecting device. The injector nozzle is so constructed that the mixture issuing therefrom will spread in conical form throughout the cylindrical gas generating chamber, the said oil injecting taking place only when and while the temperature in the superheating tubes is high enough to preheat the steam to a temperature at which all of it will react when brought into the presence of hydrocarbon.

An object of this invention is to provide means for supplying the correct proportion of oil to a definite quantity of the superheated steam.

Another object of this invention is to cause the kinetic energy of the superheated steam to lift the required quantity of hydrocarbon oil from a fixed level below an injector nozzle into a gas generating chamber within an oil gas making unit.

Another object of this invention is to cause a mixed spray of oil and the superheated steam to be introduced into a heated generating chamber and cause reaction between them.

Another object of this invention is to provide a self-draining injecting device so as to prevent any oil from remaining and carbonizing in the injecting mechanism when the plant is shut down.

Another object of this invention is to cause the superheated steam and the hydrocarbon oil to meet inside the injector nozzle immediately adjacent to the point of entrance into a reaction zone.

Another object of this invention is to provide automatic means for purging the gas generating plant for a definite time before and after gas making.

With the above and other objects in view the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views in which:

Figure 1 is a vertical central sectional view through the oil gas generating unit.

Figure 2 is a top view of the oil gas generating unit shown in Figure 1.

Figure 3 is a fragmentary sectional view, the section being taken as on line 3—3 in Figure 2.

Figure 4 is a sectional plan view, the section being taken as on line 4—4 in Figure 1.

Figure 5 is an enlarged sectional view of the injector in the position shown in Figure 1.

Figure 6 is an enlarged sectional view of the injector, the section being taken as on line 6—6 in Figure 3.

Figure 7 is a sectional view, taken as on line 7—7 in Figure 5.

Figure 9 is a side elevation of the oil gas generator and scrubber.

Figure 10 is a rear elevation of a 3-unit oil gas generator, partly broken away and showing a dutch oven.

Figure 11 is a plan view of a three-unit oil gas generator.

Figure 8:
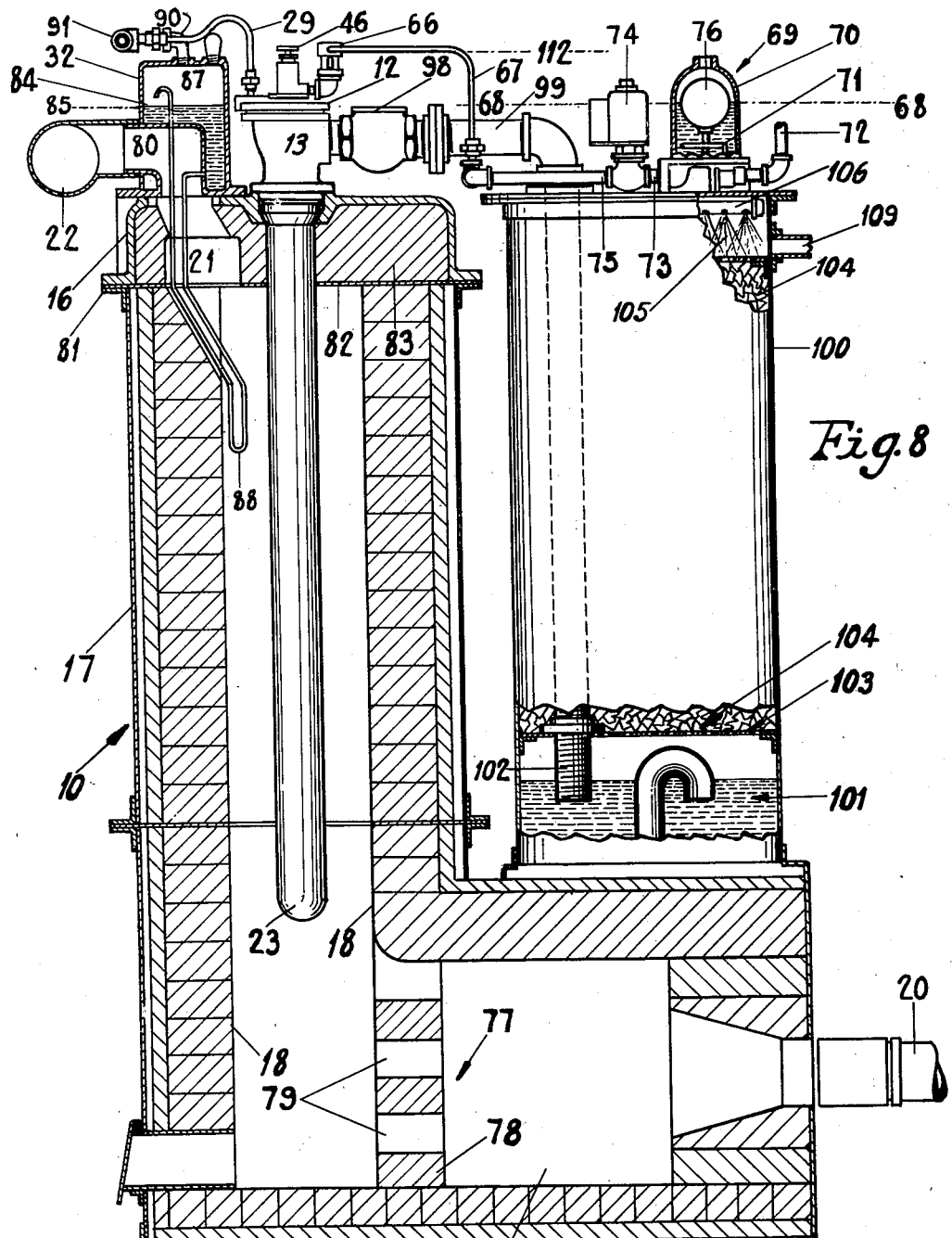
Figure 8 is a vertical elevation of the oil gas generating unit under operating conditions in a furnace and connected to a gas scrubber, the furnace being in section as on line 8—8 in Figure 11, and the scrubber being in side elevation.

In the illustrated embodiment of the invention, best shown in Figure 1, reference character 10 indicates an oil gas generating unit comprising a tubular gas generating chamber 11 which is open at its lower end and which is fastened at its upper end to a flow-directing plate 12. The flow-directing plate 12 rests upon the upper end of a gas outlet elbow 13. The elbow 13 is provided with a flange 14 through which pass bolts 15 whereby the elbow is secured to a cover 16 of a furnace 17, best shown in Figure 8.

A tubular casing 23 having a closed lower end and a beveled collar 24 at its upper end is mounted in a beveled seat in the cover 16 in such a manner that it may be removed with facility for repairs. A gasket 25 has been interposed between the elbow 13 and the collar 24 of the casing 23. A gasket 26 has been interposed between the flow-directing plate 12 and the elbow 13. A U-shaped tube 27 has been secured in threaded engagement in the flow-directing plate 12 by means of pipe fittings 28. The U-shaped tube 27 connects at one end to a pipe 29 by means of a passage 30 and a threaded hole 31 in the flow-directing plate 12. The pipe 29 is connected to a saturated steam boiler 32, best shown in Figure 8. The U-shaped tube 27 has been connected at its outlet end 33 with an aperture 34 communicating with an angular passage 35 shown in Figure 2. As best shown in Figure 3, a U-shaped tube 36 similar to the tube 27, has been secured in threaded engagement in the flow-directing plate 12 by means of pipe fittings 37 and connects at one end by means of an aperture 38 with the passage 35. The tube 36 connects at the outlet end with an aperture 39 which communicates with a generally vertical passage 40 in the body 41 of an injector 46. It will thus be seen that the plate 12 comprises an angular passage 35 for reversing the upward flow of steam in the U-shaped tube 27, into a downward flow into the U-shaped tube 36, and is termed a flow-directing plate. The injector body 41 comprises a lower extension 42 extending into an opening in the flow-directing plate 12 and having a mixing nozzle 43 in threaded engagement. A cover 44 preferably made of lava is positioned below the nozzle 43 and seats on top of the gas generating chamber 11 and serves to insulate and protect the nozzle from the intense heat in the gas generating chamber. The cover 44 is provided with an aperture 45 forming an inlet for the gas making materials into the gas generating chamber. The passage 40 terminates at its upper end in an aperture 47 in communication with an annular passage 48 around a perforated member 49, best shown in Figure 5.

The perforated member 49 has radial apertures 50 communicating with an annular passage 51 inside the perforated member. The passage 51 communicates with radial apertures 52 and with a vertical passage 54 in a spindle 53. The passage 54, in its downward direction, terminates in a mixing chamber 55 in the mixing nozzle 43. The passage 54 extends upwardly from the apertures 52 to a threaded plug 56 which can be removed for cleaning and blowing out the passage 54, the mixing chamber 55, and the aperture 45 in the cover 44. Steam from the boiler 32, thus passes through the U-shaped tubes 27 and 36 and the injector 46 into the gas generating chamber 11. A threaded gland 57 and packing 58 serve to prevent leakage of steam from the injector body 41. The spindle 53 is in threaded engagement in the body 41 by means of a threaded lower portion 59. It is thus possible to manipulate a handwheel 60 and cause the spindle 53 to move in or out of seating contact in a tapering seat 61 in the nozzle 43 and thus regulate the quantity of oil flowing continuously into the gas generating chamber 11. A hand 62 on the handwheel 60 serves for indicating the adjustment of the spindle 53 in relation to its seat and thus regulating the quantity of oil flowing through the mixing chamber 55.

As best shown in Figure 7, the lower end of the spindle 53 has been formed with a plurality of grooves 63 on its outer periphery and extending from the tapering seat 61, shown in Figure 5, upwards to a passage 64 in the body 41 and communicating with an oil pipe 65. As shown in Figure 1, the oil pipe 65 is connected to the lower end of a sight-feed device 66. An oil pipe 67 is connected at its upper end to the sight-feed device 66. A fixed oil level 68 is constantly maintained in the oil pipe 67 by being connected to a float controlled oil level regulator 69, best shown in Figure 8.

The oil level regulator 69 comprises a liquid container 70 in which is a float operated valve 71. The valve 71 serves to control the flow of oil from a storage tank supply pipe 72, thereby maintaining a fixed oil level 68 in the container 70. Oil from the regulator 69 passes through a pipe 73 and through a solenoid controlled oil valve 74 and connects by means of a pipe 75 to the vertical oil pipe 67. When the solenoid controlled oil valve 74 is open, the normal level of the oil in the pipe 67 is the same as that maintained by the float 76 in the oil level regulator 69. The oil in the pipe 67 can not rise above the normal level 68, until a vacuum is produced in the passage 64 of the injector 46 and in the pipe 67 by the kinetic energy of the steam passing through the mixing chamber 55; and then not until the solenoid valve 74 is opened to permit oil to pass from the oil level regulator 69 to the pipe 67.

As best shown in Figure 8, the vertical furnace 17 is lined with fire-resisting material 18 and is provided at its lower end with a horizontal right-angular extension or dutch oven 19 into which a gas burner 20 throws a flame. A checkered baffle wall 77 constructed of fire bricks 78, spaced apart to form openings 79, is positioned intermediate the dutch oven 19 and the furnace 17. Combustion takes place in the dutch oven where the flame is retained by the baffle wall 77. The hot products of combustion pass through the openings 79 in the baffle wall 77 and upward through the vertical furnace 17 and exit flue 21, thence through an angular flue passage 80, through the boiler 32 to a stack 22. The radiant heat from the furnace bricks 18 acts upon the tubular casing 23 and heat transfer takes place, causing the steam passing through the tubes 27 and 36 in the casing 23 to be superheated to a temperature at which all of it will react when brought into the presence of hydrocarbon.

The cover 16 of the furnace 17 is mounted on a top angle 81 secured to the furnace. A flame plate 82 has been positioned intermediate the cover 16 and the angle 81, and serves to support heat resisting lining material 83 inside the cover. The boiler 32 is mounted on top of the cover 16 with the angular flue passage 80 in alignment with the flue passage 21 thus making a continuous draft passage from the furnace 17 to the stack 22.

The walls of the angular passage 80 through the boiler 32, provide heating surfaces through which heat transfer takes place from the waste flue gases to the water 84 in the boiler. The water 84 is maintained at a constant level 85 by means of a float-controlled water level regulator 86 best shown in Figure 9. The space above the water level in the boiler forms a saturated steam space 87. A U-shaped water tube 88 may be suspended in the furnace from the boiler into the passage 80 and communicates with the water space at the bottom of the boiler and with the steam space 87 at the top of the boiler and may serve to augment the evaporating capacity of the boiler. A steam outlet pipe 90 leads from the boiler and is connected to a steam header 91, best shown in Figure 11. Saturated steam from the header 91 passes through the pipe 29 to the flow-directing plate 12.

Water is supplied to the boiler 32 from a water pipe 124. The water passes through a pipe 94 to the water level regulator 86 and through a pipe 95 to the water space at the bottom of the boiler. An equalizing pipe 96 attached to the top of the boiler returns to the water level regulator 86. As best shown in Figure 4, the gases generated in the gas generating chamber 11 are forced from the chamber by displacement, and pass into an annular space 107 formed by centering arms 108 on the open end portion of the member 11. From the annular space 107 the gases pass upward between the tubular member 11 and the tubular casing 23 into the elbow 13. From the elbow 13, the gases pass through a nipple 97, through a back-pressure or non-return valve 98, through an arch pipe 99 and enters the top of a gas scrubber 100 and is conveyed into a water seal 101 at the bottom of the scrubber by an internal pipe 102. The gases pass upwards from the water seal through a perforated supporting plate 103, through cleaning medium 104, meeting wash water spray 105 which enters the scrubber through a spray ring 106. The gases leave the scrubber through an outlet pipe 109.

It is to be noted that the embodiment heretofore described relates to a single unit oil gas generator 10, shown in Figures 1 to 9, inclusive. Figures 10 and 11 show a 3-unit oil gas generator 113 built up of three identical units 10 to increase the gas making capacity. It is also to be noted that each unit 10 is an individual oil gas making plant which makes oil gas independently of any of the other units 10, and that one, two or all three of the units 10 may be operated at any time to meet a variable demand for gas. The oil supply pipe 67 for each unit 10 is in communication with an oil supply pipe 75 common to all units 10. The hand wheel 60 on any unit, may be operated to close the spindle 53 on the seat 61 and thus shut off the oil supply and stop gas making in any particular unit.

It is to be noted that the steam passage 54 at the center of the spindle 53, best shown in Figure 5, is of small circumference and there is formed a small and confined heating surface at the center of the spindle. The oil passage is positioned on the outside of the spindle 53 and there is formed a large relative cooling surface around the outside of the spindle and that the intense heat in the steam cannot crack the oil and cause carbon deposit during the short period that the oil is in contact with the heated spindle.

The operation of each oil gas generating unit 10 or of any number of the units 10 in the 3-unit oil gas generating plant 113 is as follows:

The 3-unit oil gas generating plant 113 comprises a gas storage tank 114 wherein the gas is under pressure. When the pressure in the storage tank drops to a predetermined low point, a pressure switch 110 mounted on a sylphon in a casing 119, shown in Figure 11, turns on the electric current which opens a solenoid controlled gas supply valve 115 supplying gas to the gas burner 20, and opens the solenoid controlled water supply valve 92 supplying water to the gas scrubber 100. The water level regulator 86 is under constant pressure and is supplied from any suitable source through a pipe 124. From the water level regulator 86, the water is fed and maintained at a constant level 85 in the boiler 32 (Fig. 9). The electric current also sets a control pyrometer 111 into operation. The gas in the burner 20 is immediately ignited by a gas pilot or by electric ignition (not shown), and the temperature in the furnace 17 comences to rise and the water in the boiler 32 is evaporated into saturated steam by the waste heat in the flue gases passing through the boiler. The saturated steam travels through the superheating tubes 27 and 36 in the tubular casing 23, and finally to the mixing nozzle 43 (Fig. 1). From the mixing nozzle 43, the steam passes into the gas generating chamber 11. When the tubular casing 23 reaches a temperature above 1900° F., a thermocouple 120 inserted in the furnace 17 actuates the pyrometer 111 which opens the normally closed solenoid controlled oil valve 74 and admits oil to the pipe 67, to a level 68, best shown in Figure 8. The high velocity of the superheated steam passing through the mixing nozzle 43 causes a vacuum in the oil passage 64 (Fig. 5), and causes the oil to rise from the low oil level 68 to a high oil level 112, shown in Figure 1, and to pass into the mixing chamber 55, where the dissociated gases and oil commingle and pass into the gas generating chamber 11, where reaction takes place and oil gas is generated.

The gases pass from the gas generating chamber 11 up through the annular space 107 (Figs. 1 and 4), then through the elbow 13 and enters the gas scrubber 100 through the internal pipe 102 which terminates below the water seal 101. The gases pass upwards from the water seal 101 through the cleaning medium 104 and leave the scrubber through the outlet pipe 109, through the valve 116, the gas pump 117, the bellows 118 and into the storage tank 114.

It is to be noted that the pyrometer 111 not only causes the solenoid controlled oil valve 74 to open but at the same time turns on an electric current which closes the passage in the solenoid operated purging 3-way vent valve 116, which is normally open, venting the plant through a pipe 121 to the atmosphere. Closing the passage through the valve 116 leading to the vent pipe 121, opens a passage through the valve, leading through a pipe 122 to a gas pump 117, thus admitting gas to the pump. The pyrometer also immediately starts the operation of the pump 117 which takes the gas from the scrubber 100 and delivers same under pressure through the casing 119 to the gas storage tank 114. The pressure switch 110 is arranged in circuit with a source of current supply through the cable 118.

While the gas plant is operating, the pyrometer 111 also controls the temperature in each unit within predetermined high and low limits approximately fifty degrees apart, such as between 1900° F. and 1950° F. This is accomplished by means of a solenoid controlled valve 123 which is normally wide open. As the temperature rises to the maximum limit, the pyrometer closes the valve 123 to permit only a predetermined minimum supply of gas to pass to the gas burner 20, thereby lowering the temperature in each unit.

When the temperature drops to the minimum limit, the pyrometer opens the valve 123 to permit a predetermined maximum supply of gas to pass to the gas burner 20, thereby raising the temperature in each unit and controlling the temperature variations within close limits.

When the pressure in the gas storage tank 114 reaches a predetermined high pressure, the pressure switch 110 turns off the electric current from the main supply 118 and the electrically operated valves and pyrometer return to their non-operating positions.

I claim:

1. In apparatus for generating oil gas, a furnace having a heat insulated cover, a tubular casing suspended in said furnace and having a closed lower end in the combustion zone, a gas outlet mounted above said cover and seating on said casing, a source of steam, a steam flow directing plate mounted on said outlet, U-shaped tubes connected at their upper ends by said flow directing plate to cause steam passage in series through said tubes, said tubes being suspended interior of said casing and passing through said combustion upper end for injecting a continuous supply of zone and causing said steam to reach a temperature at which substantially all of it will react when brought into the presence of hydrocarbon, a tubular generating chamber connected to said flow directing plate and suspended centrally of said tubular casing, means for connecting the outlet of said U-shaped tubular members directly with a super-heated steam injector for injecting a continuous supply of liquid hydrocarbon into said gas generating chamber, said steam being superheated to said reaction temperature before entering said injector.

2. In an oil gas generating unit, a tubular casing closed at its lower end and suspended within a furnace, U-shaped tubular members co-extensive with and positioned within said casing, said U-shaped members being connected in series at their upper ends by a flow-directing plate to cause steam passage in series through said members, a tubular gas generating chamber substantially coextensive with and centrally disposed within said casing and open at the lower end of said casing and having a superheated steam injector at its liquid hydrocarbon into said generating chamber, said generating chamber being highly heated by the products of combustion from said furnace, said injector having a central steam passage of small heat transfer surface disposed within an annular oil passage of larger surface, means in said generating chamber for thermally insulating said oil injector from the heated gases therein, a source of steam, said U-shaped members being wholly encased and forming a continuous steam superheating passage leading directly into said injector, means for controlling the heating of said casing to a predetermined high temperature, said superheating steam passage causing said steam to pass through the combustion zone in said furnace and to reach a temperature at which substantially all of said steam will react when brought into the presence of said hydrocarbon before entering said injector and thereby accelerating said gas making reaction.

3. In an oil gas generating unit having a generating chamber, a furnace, means for heating said chamber by the products of combustion from said furnace to form a high temperature zone, a steam supply, means for conveying said steam through said combustion zone and causing it to be superheated to a temperature at which substantially all of it will react when brought into the presence of hydrocarbon, an oil supply at a level below the inlet level of said heated zone, a normally closed oil supply valve and temperature responsive means for opening and maintaining said valve in open position only when and while the temperature is sufficient to superheat the steam to said high temperature, a superheated steam injector at one end of said generating chamber, means for thermally insulating said injector from the heated gases in said chamber, said injector having a passage wherein said superheated steam forms a vacuum sufficient for raising said oil from said low level to said high level and to inject a continuous supply of liquid oil into said heated zone, said steam being superheated to said reaction temperature before entering said injector.

4. In an oil gas generating unit having a generating chamber, a furnace, means for heating said chamber by the products of combustion from said furnace to form a high temperature reaction zone, a steam supply, means for conveying said steam through the combustion zone in said furnace and causing it to be superheated to a temperature at which substantially all of it will react when brought into the presence of hydrocarbon, an oil supply at a level below the inlet level of said heated zone, a normally closed oil supply valve and temperature responsive means for opening and maintaining said valve in open position only when and while the temperature is sufficient to superheat the steam to said high temperature, a superheated steam injector at one end of said generating chamber, means for thermally insulating said injector from the heated gases in said chamber, means for delivering said superheated steam directly into said injector and said reaction zone in a single jet, said injector having a passage wherein said superheated steam forms a vacuum sufficient for raising said oil from said low level and to inject a continuous supply of liquid oil into said heated reaction zone, said injected oil being annularly disposed around said steam jet and the flow of said oil being concomitant and dependent on the flow of said superheated steam, said steam being superheated to said reaction temperature before entering said injector.

WALTER B. HARRIS.

CERTIFICATE OF CORRECTION.

Patent No. 2,077,236. April 13, 1937.

WALTER B. HARRIS.

It is hereby certified that error appears in the printed specification of the above numbered patent requiring correction as follows: Page 4, first column, line 43, claim 1, strike out the words "upper end for injecting a continuous supply of" and insert the same after line 66, claim 2; and that the said Letters Patent should be read with this correction therein that the same may conform to the record of the case in the Patent Office.

Signed and sealed this 5th day of October, A. D. 1937.

Henry Van Arsdale (Seal)　　　　　　　　　　　　　　Acting Commissioner of Patents.